US012583441B2

(12) United States Patent
Matsuno

(10) Patent No.: US 12,583,441 B2
(45) Date of Patent: Mar. 24, 2026

(54) VEHICLE CONTROL DEVICE

(71) Applicant: SUBARU CORPORATION, Tokyo (JP)

(72) Inventor: Koji Matsuno, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 19/207,528

(22) Filed: May 14, 2025

(65) Prior Publication Data

US 2025/0376154 A1     Dec. 11, 2025

(30) Foreign Application Priority Data

Jun. 11, 2024     (JP) ................................. 2024-094738

(51) Int. Cl.
  *B60W 30/045*          (2012.01)
  *B60K 23/04*           (2006.01)
(52) U.S. Cl.
  CPC ........... *B60W 30/045* (2013.01); *B60K 23/04* (2013.01); *B60K 2023/043* (2013.01); *B60W 2520/14* (2013.01); *B60W 2540/18* (2013.01); *B60W 2710/125* (2013.01)
(58) Field of Classification Search
  CPC ........... B60W 30/045; B60W 2520/14; B60W 2540/18; B60W 2710/125; B60K 23/04; B60K 2023/043
  See application file for complete search history.

(56) References Cited

U.S. PATENT DOCUMENTS

| | | | | |
|---|---|---|---|---|
| 5,742,917 A | * | 4/1998 | Matsuno | ............ B60K 23/0808 |
| | | | | 701/88 |
| 8,285,450 B2 | | 10/2012 | Ushiroda et al. | |
| 2002/0156580 A1 | * | 10/2002 | Matsuura | ............ B60T 8/17558 |
| | | | | 701/41 |

FOREIGN PATENT DOCUMENTS

| | | | | |
|---|---|---|---|---|
| JP | 2882219 B2 | * | 4/1999 | ........... B60K 17/348 |
| JP | 2007-239819 A | | 9/2007 | |

* cited by examiner

*Primary Examiner* — Tisha D Lewis
(74) *Attorney, Agent, or Firm* — Rimon P.C.

(57)     ABSTRACT

A vehicle control device for a vehicle includes: one or more processors; and one or more memories coupled to the one or more processors. The one or more processors are configured to execute a process including: deriving a target yaw rate based on a steering angle obtained by a steering angle sensor of the vehicle; deriving a deviation of an actual yaw rate, obtained by a yaw rate sensor of the vehicle, relative to the target yaw rate; when the deviation is not a value representing overshoot where the actual yaw rate is substantially higher than the target yaw rate, preventing execution of differential limiting by a differential limiting device of the vehicle; and when the deviation is a value representing the overshoot, causing execution of differential limiting by the differential limiting device.

4 Claims, 5 Drawing Sheets

VEHICLE CONTROL DEVICE

CROSS-REFERENCE TO RELATED APPLICATIONS

The present application claims priority from Japanese Patent Application No. 2024-094738 filed on Jun. 11, 2024, the entire contents of which are hereby incorporated by reference.

BACKGROUND

The disclosure relates to a vehicle control device.

For example, Japanese Unexamined Patent Application Publication (JP-A) No. 2007-239819 discloses a differential limiting control device configured to control the differential limiting force between the left and right front wheels of a vehicle. In JP-A 2007-239819, the differential limiting force is corrected according to the combination of the vehicle's steering characteristics and the relationship between the speeds of the left and right wheels.

SUMMARY

An aspect of the disclosure provides a vehicle control device configured to be applied to a vehicle. The vehicle includes a steering angle sensor, a yaw rate sensor, a differential device, and a differential limiting device. The steering angle sensor is configured to detect a steering angle. The yaw rate sensor is configured to detect an actual yaw rate. The differential device is configured to allow for differential action of a left wheel and a right wheel of the vehicle. The differential limiting device is configured to limit differential action of the left wheel and the right wheel through the differential device. The vehicle control device includes one or more processors, and one or more memories coupled to the one or more processors. The one or more processors are configured to execute a process including: deriving a target yaw rate based on the steering angle obtained by the steering angle sensor; deriving a deviation of the actual yaw rate, obtained by the yaw rate sensor, relative to the target yaw rate; when the deviation is not a value representing overshoot where the actual yaw rate is substantially higher than the target yaw rate, preventing execution of differential limiting by the differential limiting device; and when the deviation is a value representing the overshoot, causing execution of differential limiting by the differential limiting device.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

Generally, during vehicle turning, the differential device allows for the differential action of the left wheel and the right wheel. As a result, during the initial steering phase, the actual yaw rate rises relatively quickly in response to the rise of the target yaw rate. However, after that, the actual yaw rate may excessively overshoot the target yaw rate. While overshoot is occurring, the vehicle becomes oversteering. When excessive overshoot occurs, the stability of the vehicle's yaw behavior in response to steering may be reduced.

Accordingly, it is desirable to provide a vehicle control device capable of improving the stability of the vehicle's yaw behavior without impairing the responsiveness of the vehicle's yaw behavior in response to steering.

Hereinafter, an embodiment of the disclosure will be described in detail with reference to the accompanying drawings. Specific dimensions, materials, numerical values, and the like discussed in the embodiment are merely examples for facilitating understanding of the disclosure, and do not limit the disclosure unless otherwise stated. In the present specification and the drawings, for elements having substantially the same functions and configurations, overlapping descriptions are omitted by denoting them by the same reference symbols, and elements not directly related to the disclosure are omitted from the illustrations.

Figure 1:
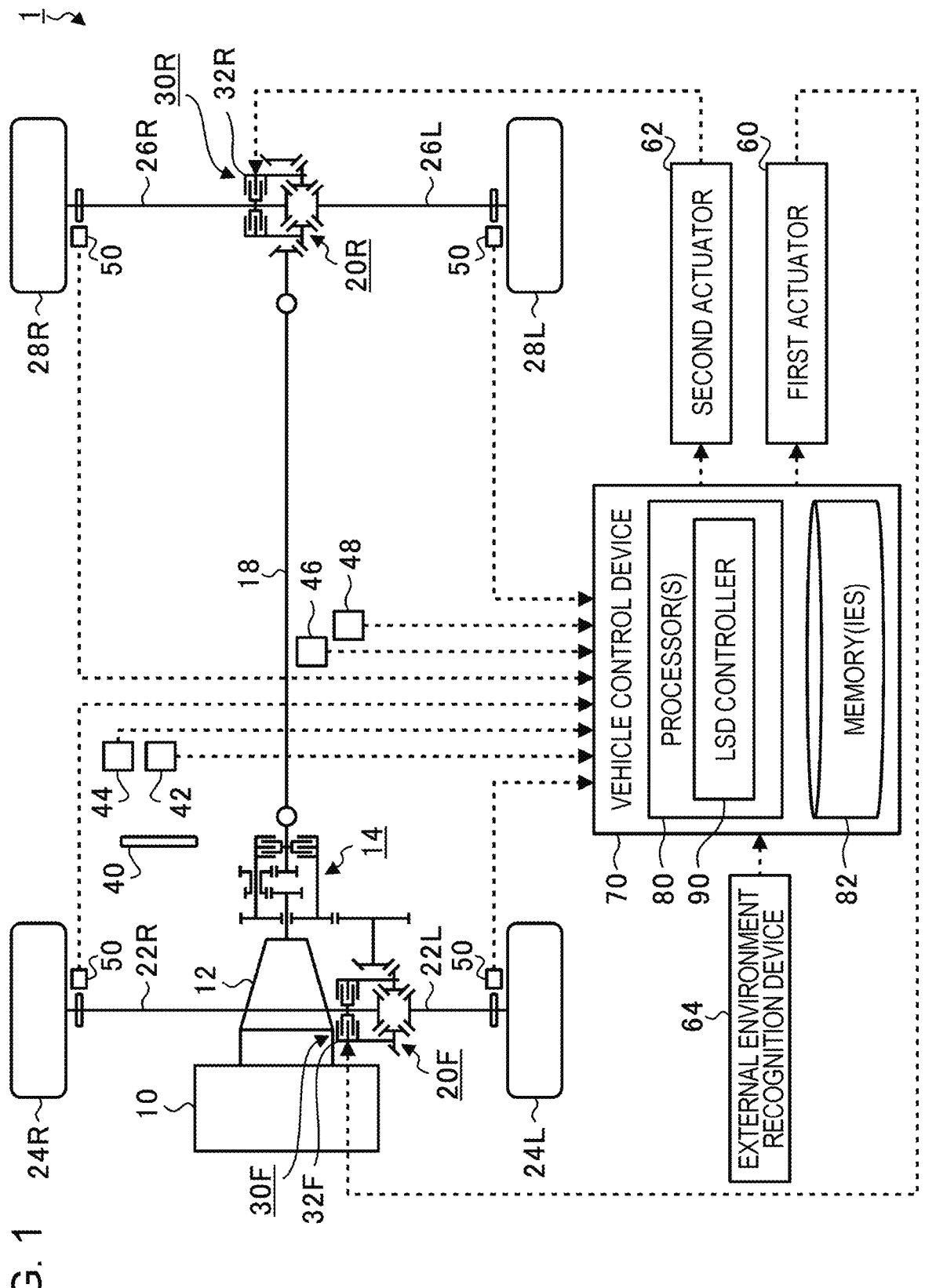
FIG. 1 is a schematic diagram illustrating the configuration of a vehicle according to an embodiment.

FIG. 1 is a schematic diagram illustrating the configuration of a vehicle 1 according to the present embodiment. The vehicle 1 is, for example, an engine vehicle including an engine 10 as a drive source. Note that the vehicle 1 is not limited to an engine vehicle, and may be an electric vehicle including a motor generator as a drive source, or may be a hybrid electric vehicle including the engine 10 and a motor generator as drive sources.

The vehicle 1, in addition to the engine 10, includes a transmission 12, a center differential device 14, a propeller shaft 18, a front differential device 20F, a rear differential device 20R, a left front axle 22L, a right front axle 22R, a left front wheel 24L, a right front wheel 24R, a left rear axle 26L, a right rear axle 26R, a left rear wheel 28L, and a right rear wheel 28R.

The engine 10 is an internal combustion engine, such as a gasoline engine, for example. The transmission 12 is a power transmission device that transmits the output of the engine 10 to the center differential device 14. The transmission 12 includes, for example, a continuously variable transmission, a starting device such as a torque converter, and a forward/reverse shift mechanism.

The center differential device 14 is coupled to the front differential device 20F, and to the rear differential device 20R via the propeller shaft 18. The center differential device 14 transmits the output of the engine 10, transmitted through the transmission 12, to the front differential device 20F and the rear differential device 20R.

The front differential device 20F is coupled to the left front wheel 24L through the left front axle 22L and to the right front wheel 24R through the right front axle 22R. The front differential device 20F allows for the differential rotation between the left front wheel 24L and the right front wheel 24R. In other words, the front differential device 20F allows for the differential action of the left front wheel 24L and the right front wheel 24R.

The rear differential device 20R is coupled to the left rear wheel 28L through the left rear axle 26L and to the right rear wheel 28R through the right rear axle 26R. The rear differential device 20R allows for the differential rotation between the left rear wheel 28L and the right rear wheel 28R. In other words, the rear differential device 20R allows for the differential action of the left rear wheel 28L and the right rear wheel 28R.

For the sake of convenience in description, the left front axle 22L and right front axle 22R are sometimes collectively referred to simply as the front axles. The left rear axle 26L and right rear axle 26R are sometimes collectively referred to simply as the rear axles. The left front wheel 24L and the left rear wheel 28L are sometimes collectively referred to as the left wheel. The right front wheel 24R and the right rear wheel 28R are sometimes collectively referred to as the right wheel. The left front wheel 24L and the right front wheel 24R are sometimes collectively referred to as the front wheels. The left rear wheel 28L and the right rear wheel 28R are sometimes collectively referred to as the rear wheels. The left front wheel 24L, the right front wheel 24R, the left rear wheel 28L, and the right rear wheel 28R are sometimes collectively referred to as the wheels.

Additionally, for the sake of convenience in description, the front differential device 20F and the rear differential device 20R are sometimes collectively referred to simply as the differential device. The differential device allows for the differential action of the left wheel and the right wheel.

The vehicle 1 further includes a front differential limiting device 30F and a rear differential limiting device 30R.

The front differential limiting device 30F is configured to be capable of limiting differential action of the left front wheel 24L and the right front wheel 24R through the front differential device 20F. In more detail, the front differential limiting device 30F includes a front transfer clutch 32F. The front transfer clutch 32F, when engaged, allows for the transmission of transfer torque from either the left front wheel 24L or the right front wheel 24R to the other. In the front differential limiting device 30F, when the front transfer clutch 32F is in the released state, differential action of the left front wheel 24L and the right front wheel 24R is allowed. In the front differential limiting device 30F, when the front transfer clutch 32F is in the engaged state, differential action of the left front wheel 24L and the right front wheel 24R is limited by the engagement force of the front transfer clutch 32F.

The rear differential limiting device 30R is configured to be capable of limiting differential action of the left rear wheel 28L and the right rear wheel 28R through the rear differential device 20R. In more detail, the rear differential limiting device 30R includes a rear transfer clutch 32R. The rear transfer clutch 32R, when engaged, allows for the transmission of transfer torque from either the left front wheel 28L or the right front wheel 28R to the other. In the rear differential limiting device 30R, when the rear transfer clutch 32R is in the released state, differential action of the left front wheel 28L and the right front wheel 28R is allowed. In the rear differential limiting device 30R, when the rear transfer clutch 32R is in the engaged state, differential action of the left front wheel 28L and the right front wheel 28R is limited by the engagement force of the rear transfer clutch 32R.

For the sake of convenience in description, the front differential limiting device 30F and the rear differential limiting device 30R are sometimes collectively referred to simply as the differential limiting device. The front transfer clutch 32F and the rear transfer clutch 32R are sometimes collectively referred to simply as the transfer clutch.

The vehicle 1 further includes a steering device 40, a steering angle sensor 42, an accelerator pedal sensor 44, a lateral acceleration sensor 46, a yaw rate sensor 48, and wheel speed sensors 50.

The steering device 40 includes a steering wheel capable of receiving input of a steering operation performed by a driver who drives the vehicle 1. The steering device 40 is configured to be capable of changing the steering angle of the front wheels, which serve as the steering wheels, based on steering operations input to the steering wheel.

The steering angle sensor 42 detects the steering angle representing the rotational angle of the steering wheel. The accelerator pedal sensor 44 detects the amount of the driver's operation of the accelerator pedal. The lateral acceleration sensor 46 detects the lateral acceleration representing the sideward acceleration of the vehicle 1. The yaw rate sensor 48 detects the actual yaw rate representing the real yaw rate of the vehicle 1. The yaw rate represents the angular velocity of the vehicle 1 around its vertical axis.

The wheel speed sensors 50 are provided for the individual wheels. The wheel speed sensors 50 detect the wheel speeds of the corresponding wheels. Wheel speed represents the rotational speed of the wheel.

The vehicle 1 further includes a first actuator 60, a second actuator 62, an external environment recognition device 64, and a vehicle control device 70. That is, the vehicle control device 70 according to the present embodiment is provided in the vehicle 1.

The first actuator 60, under the control of the vehicle control device 70, operates the front transfer clutch 32F of the front differential limiting device 30F. The second actuator 62, under the control of the vehicle control device 70, operates the rear transfer clutch 32R of the rear differential limiting device 30R.

The external environment recognition device 64 is configured to be capable of detecting obstacles around the vehicle 1. For example, the external environment recognition device 64 may include an imaging device that captures images outside the vehicle 1, and an image processing device that determines whether there is an obstacle around the vehicle 1 based on image information obtained by the imaging device.

The external environment recognition device 64 may identify an obstacle in front of the vehicle 1 and derive a time-to-collision (TTC) with the identified obstacle. The external environment recognition device 64 may also derive a lap rate for the identified obstacle.

The vehicle control device 70 includes one or more processors 80 and one or more memories 82 coupled to the processor(s) 80. The memory(ies) 82 include a ROM in which a program and the like are stored and a RAM as a work area. The processor(s) 80 cooperate with the program included in the memory(ies) 82 to control each part of the vehicle 1.

For example, the processor(s) 80 of the vehicle control device 70 execute the program, thereby serving as a limited-slip differential (LSD) controller 90. The LSD controller 90 controls the engagement force of the front transfer clutch 32F of the front differential limiting device 30F through the first actuator 60. The LSD controller 90 controls the engagement force of the rear transfer clutch 32R of the rear differential limiting device 30R through the second actuator 62. Note that LSD stands for Limited-Slip Differential, meaning a differential limiting device.

Hereinafter, control of a comparative example will be described before describing the operation of the vehicle control device 70 of the present embodiment. After that, the operation of the vehicle control device 70 of the present embodiment will be described while comparing it with the comparative example.

Figure 2:
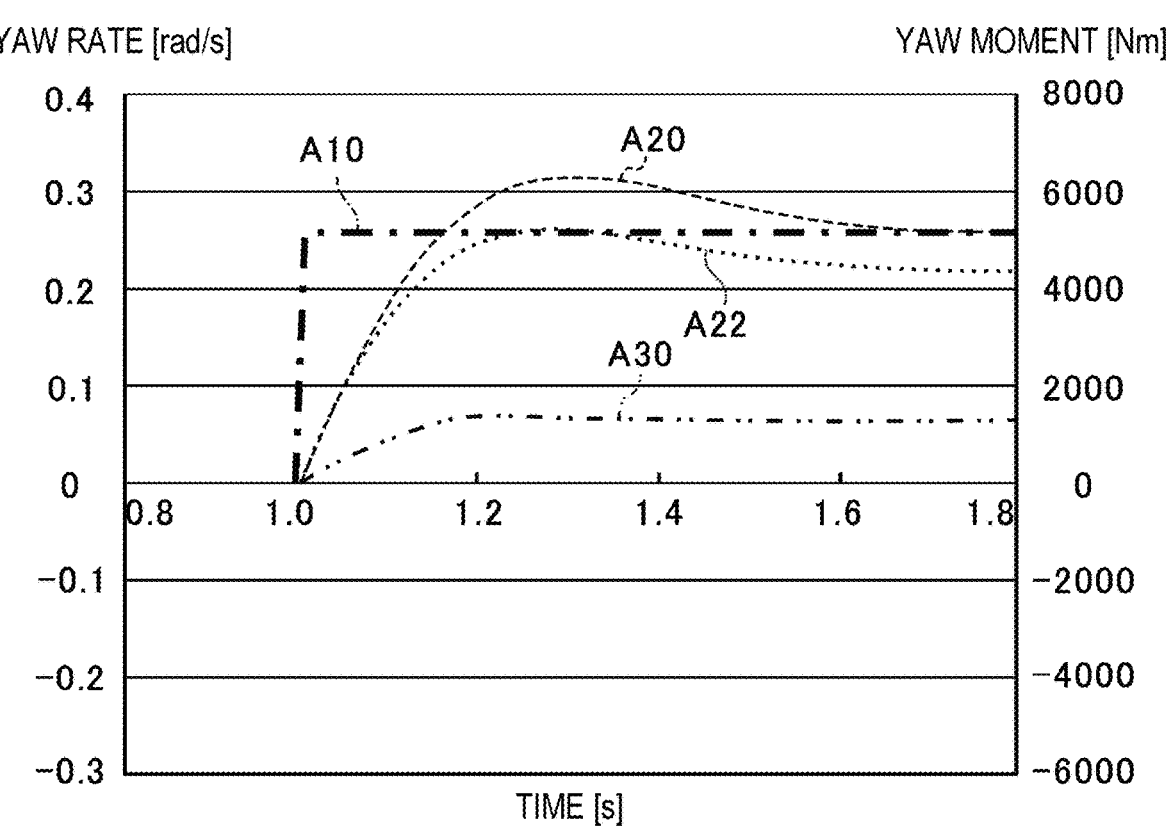
FIG. 2 is a diagram illustrating control of a comparative example.

FIG. 2 is a diagram illustrating control of the comparative example. In FIG. 2, prior to the time point "1.0," the vehicle is in a straight-ahead state. In FIG. 2, it is assumed that, when the time point "1.0" is reached in that situation, the rotation of the steering wheel begins, which in turn initiates vehicle turning.

In FIG. 2, chain line A10 represents an example of a target yaw rate based on the steering angle. The target yaw rate represents a control target value for the yaw rate. As indicated by chain line A10 after the time point "1.0," when the steering wheel rotates, the target yaw rate increases sharply according to the steering angle.

Generally, during vehicle turning, the differential device allows for the differential action of the left wheel and the right wheel. In FIG. 2, long dashed line A20 represents an example of the actual yaw rate when the vehicle turns with differential action allowed between the left and right wheels.

As indicated in the portion of long dashed line A20 from the time point "1.0" to near the time point "1.15," during the initial steering phase, the actual yaw rate rises relatively quickly in response to the rise of the target yaw rate. That is, when turning with differential action allowed, the steering response performance during the initial steering phase is relatively high.

However, as indicated in the portion of long dashed line A20 from near the time point "1.15" to near the time point "1.6," the actual yaw rate (long dashed line A20) may excessively overshoot the target yaw rate (chain line A10). Overshoot means that the actual yaw rate is substantially higher than the target yaw rate. While overshoot is occurring, the vehicle becomes oversteering. When excessive overshoot occurs, the stability of the vehicle's yaw behavior in response to steering may be reduced.

In contrast, a situation is assumed where, for example, regardless of the occurrence of wheel slip, the differential limiting device limits the differential action of the left wheel and the right wheel, and, with the differential action of the left and right wheels limited, the vehicle in a straight-ahead state begins to turn.

In FIG. 2, short dashed line A22 represents an example of the actual yaw rate when the vehicle turns with limited differential action between the left and right wheels. Additionally, in FIG. 2, two-dot chain line A30 represents an example of the understeer-side yaw moment acting on the vehicle in the opposite direction of the turning direction when the vehicle turns with limited differential action between the left and right wheels.

When the vehicle turns with limited differential action between the left and right wheels, the understeer-side yaw moment will act on the vehicle, as indicated by two-dot chain line A30. With the action of the understeer-side yaw moment as above, as indicated in the portion of short dashed line A22 from near the time point "1.2" to near the time point "1.3," it is possible to suppress the actual yaw rate (short dashed line A22) from overshooting the target yaw rate (chain line A10).

However, when the vehicle turns with limited differential action between the left and right wheels, as indicated in the portion of short dashed line A22 from the time point "1.0" to near the time point "1.15," the actual yaw rate rises relatively slowly during the initial steering phase. For example, the time it takes for the actual yaw rate to reach from "0" to "0.2" is slower in the case of the actual yaw rate with limited differential action (short dashed line A22)

compared to the actual yaw rate with allowed differential action (long dashed line A20). That is, when the vehicle turns with limited differential action, the steering response performance during the initial steering phase is reduced compared to the case where the vehicle turns with allowed differential action.

Accordingly, the vehicle control device 70 of the present embodiment derives a deviation of the actual yaw rate relative to the target yaw rate. The vehicle control device 70 of the present embodiment prevents execution of differential limiting by the differential limiting device when the deviation is not a value representing overshoot, and causes execution of differential limiting by the differential limiting device when the deviation is a value representing overshoot.

Figure 3:
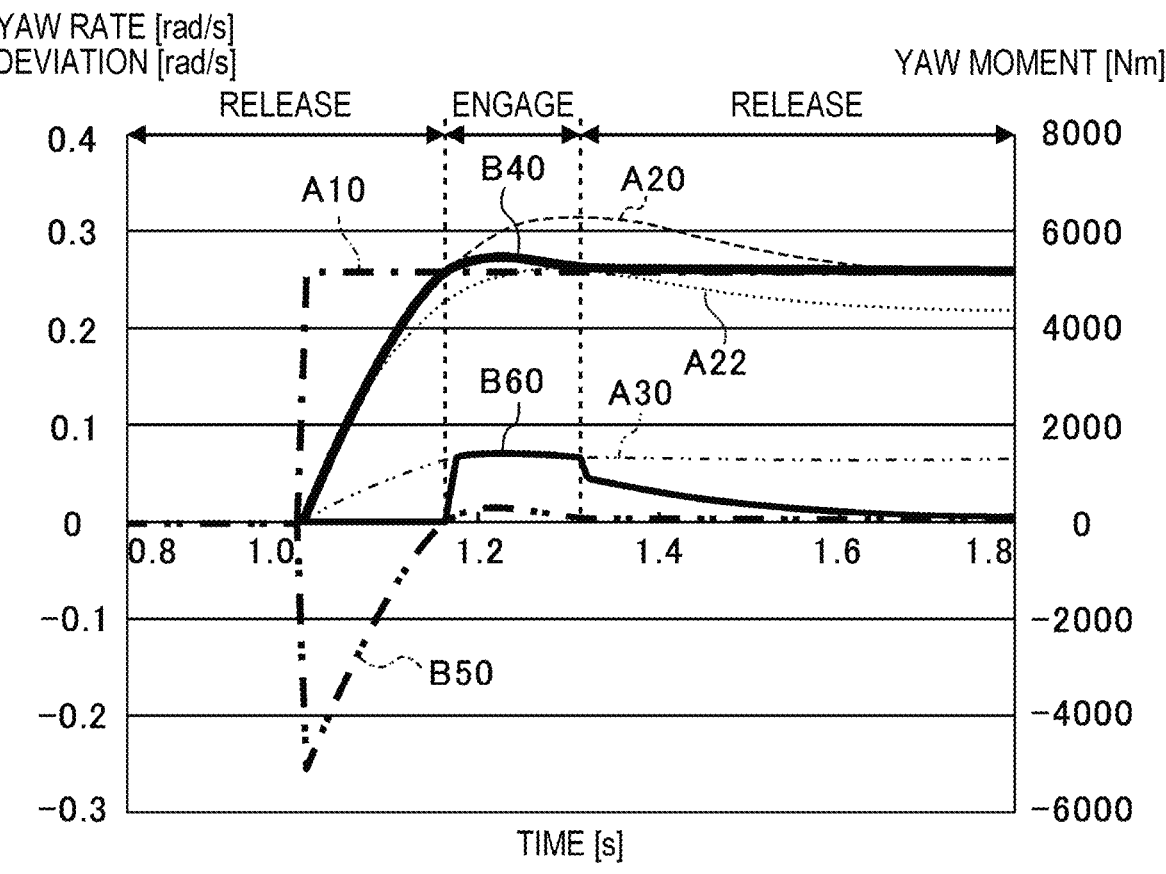
FIG. 3 is a diagram illustrating an overview of the operation of a vehicle control device of the present embodiment.

FIG. 3 is a diagram illustrating an overview of the operation of the vehicle control device 70 of the present embodiment. For the sake of convenience in description, chain line A10, long dashed line A20, short dashed line A22, and two-dot chain line A30 described with reference to FIG. 2 are also illustrated in FIG. 3.

In FIG. 3, solid line B40 represents an example of the actual yaw rate of the vehicle 1 of the present embodiment. In FIG. 3, two-dot chain line B50 represents an example of the deviation of the actual yaw rate (solid line B40) relative to the target yaw rate (chain line A10). In FIG. 3, solid line B60 represents an example of a yaw moment acting on the vehicle 1 of the present embodiment.

As described above, in the vehicle control device 70 of the present embodiment, whether to execute differential limiting by the differential limiting device is determined based on whether the deviation is a value representing overshoot. Here, a value representing overshoot means a value indicating that the actual yaw rate is substantially higher than the target yaw rate. That is, the case where the deviation is a value representing overshoot corresponds to the case where the deviation (two-dot chain line B50) is substantially greater than zero.

In FIG. 3, during the period from the time point "0.8" to the time point "1.0," the vehicle 1 is in a straight-ahead state, and the deviation is substantially less than or equal to zero. Thus, during the period from the time point "0.8" to the time point "1.0," the vehicle control device 70 prevents execution of differential limiting by setting the transfer clutch of the differential limiting device to the released state.

In FIG. 3, like the example illustrated in FIG. 2, the rotation of the steering wheel begins at the time point "1.0." As indicated in the portion of two-dot chain line B50 from the time point "1.0" to near the time point "1.15," the deviation is less than or equal to zero during the initial steering phase. Based on this, during the period from the time point "1.0" to near the time point "1.15," the vehicle control device 70 prevents execution of differential limiting by setting the transfer clutch of the differential limiting device to the released state.

As a result, in the vehicle 1 of the present embodiment, the differential action of the left and right wheels is allowed during the initial steering phase. Therefore, as indicated by solid line B40, in the vehicle 1 of the present embodiment, the actual yaw rate rises relatively quickly during the initial steering phase. As a result, in the vehicle 1 of the present embodiment, a decrease in steering response performance during the initial steering phase can be suppressed.

Additionally, in the portion of two-dot chain line B50 from the time point "1.15" to near the time point "1.3," the deviation is substantially higher than zero. Thus, during the period from the time point "1.15" to near the time point "1.3," the vehicle control device 70 causes execution of differential limiting by setting the transfer clutch of the differential limiting device to the engaged state. As a result, in the vehicle 1 of the present embodiment, the differential action of the left and right wheels becomes limited once the engagement of the transfer clutch begins.

Consequently, after the time point at which the engagement of the transfer clutch begins, the understeer-side yaw moment occurs, as indicated by solid line B60 in FIG. 3. With the action of the understeer-side yaw moment as above, it is possible to suppress overshoot of the actual yaw rate, as indicated by solid line B40. As a result, in the vehicle 1 of the present embodiment, a decrease in the stability of the vehicle's yaw behavior in response to steering during turning can be suppressed.

Additionally, in the example illustrated in FIG. 3, near the time point "1.3" in two-dot chain line B50, the deviation transitions from being substantially greater than zero to being substantially less than or equal to zero. Based on this, in the vicinity of the time point "1.3," the vehicle control device 70 prevents execution of differential limiting by gradually setting the transfer clutch of the differential limiting device to the released state. As a result, in the vehicle 1 of the present embodiment, the differential action of the left and right wheels becomes allowed once the release of the transfer clutch begins.

Consequently, after the time point at which the transfer clutch is switched from the engaged state to the released state, the yaw moment begins to decrease, as indicated by solid line B60 in FIG. 3. In this way, as the understeer-side yaw moment decreases, in the vehicle 1 of the present embodiment, it is possible to suppress an excessive drop in the actual yaw rate relative to the target yaw rate after the time point "1.3," as indicated by solid line B40. As a result, in the present embodiment, as indicated by solid line B40, the actual yaw rate can be relatively quickly converged to the target yaw rate, and a decrease in the stability of the vehicle's yaw behavior in response to steering during turning can be further suppressed.

Figure 4:
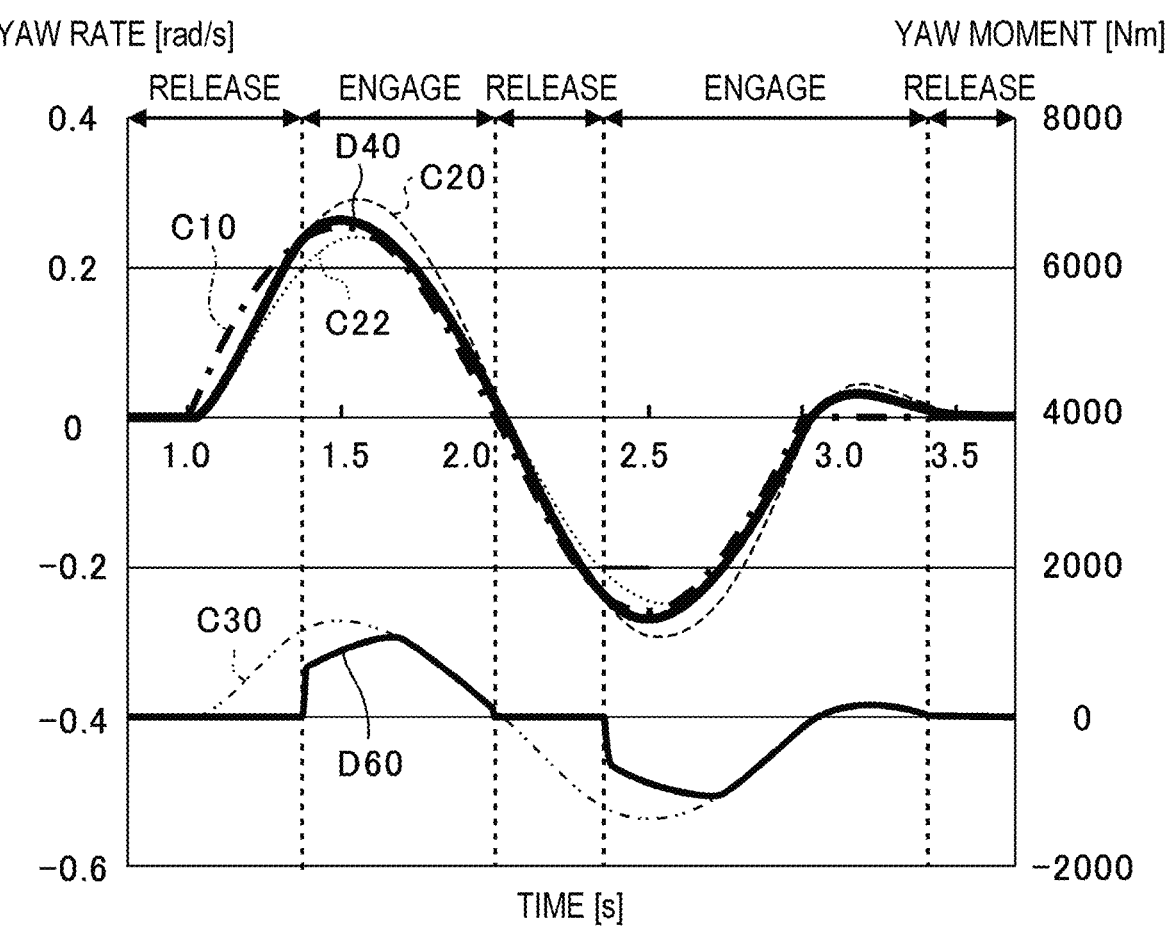
FIG. 4 is a diagram illustrating another operation example of the vehicle control device of the present embodiment.

FIG. 4 is a diagram illustrating another operation example of the vehicle control device 70 of the present embodiment. In FIG. 4, chain line C10 represents another example of the target yaw rate. FIG. 4 illustrates a case where the steering wheel is rotated such that the target yaw rate follows a sinusoidal pattern. That is, in FIG. 4, in the vicinity of the time point "2.0," the steering wheel is turned in the opposite direction.

In FIG. 4, long dashed line C20 represents the actual yaw rate when the vehicle turns with differential action allowed between the left and right wheels. Short dashed line C22 represents the actual yaw rate when the vehicle turns with limited differential action between the left and right wheels. Two-dot chain line C30 represents the understeer-side yaw moment acting on the vehicle when the vehicle turns with limited differential action between the left and right wheels. Solid line D40 represents the actual yaw rate due to the operation of the vehicle control device 70 of the present embodiment. Solid line D60 represents the yaw moment acting on the vehicle 1 of the present embodiment.

In the example illustrated in FIG. 4, during the period from the time point "1.0" to near the time point "1.4," the actual yaw rate (solid line D40) is less than or equal to the target yaw rate (chain line C10), indicating that the deviation is less than or equal to a value representing overshoot. Thus, during the period from the time point "1.0" to near the time point "1.4," the vehicle control device 70 of the present embodiment prevents execution of differential limiting by setting the transfer clutch of the differential limiting device to the released state. As a result, in the vehicle 1 of the present embodiment, the actual yaw rate (solid line D40) rises relatively quickly during the initial steering phase, helping to suppress a decrease in steering response performance during the initial steering phase.

In the example illustrated in FIG. 4, during the period from the time point "1.4" to near the time point "2.0," the actual yaw rate (solid line D40) is higher than the target yaw rate (chain line C10), indicating that the deviation is greater than a value representing overshoot. Thus, during the period from the time point "1.4" to near the time point "2.0," the vehicle control device 70 of the present embodiment causes execution of differential limiting by setting the transfer clutch of the differential limiting device to the engaged state. Consequently, the understeer-side yaw moment occurs, as indicated by solid line D60. As a result, it is possible to suppress overshoot of the actual yaw rate in the vehicle 1 of the present embodiment.

In the example illustrated in FIG. 4, during the period from near the time point "2.0" to near the time point "2.4," the target yaw rate (chain line C10) and the actual yaw rate (solid line D40) are negative values. During this period, in terms of absolute values, the actual yaw rate is less than or equal to the target yaw rate, indicating that the deviation is less than or equal to a value representing overshoot. Thus, during the period from near the time point "2.0" to near the time point "2.4," the vehicle control device 70 of the present embodiment prevents execution of differential limiting by setting the transfer clutch of the differential limiting device to the released state. As a result, in the vehicle 1 of the present embodiment, even when the steering wheel is turned in the opposite direction, the actual yaw rate (solid line D40) rises relatively quickly during the initial turning phase, helping to suppress a decrease in steering response performance during the initial turning phase.

In the example illustrated FIG. 4, during the period from the time point near "2.4" to near the time point "3.0," the target yaw rate (chain line C10) and the actual yaw rate (solid line D40) continue to be negative values. During this period, in terms of absolute values, the actual yaw rate is higher than the target yaw rate, indicating that the deviation is greater than a value representing overshoot. Thus, during the period from near the time point "2.4" to near the time point "3.0," the vehicle control device 70 of the present embodiment causes execution of differential limiting by setting the transfer clutch of the differential limiting device to the engaged state. Consequently, the understeer-side yaw moment occurs, as indicated by solid line D60. As a result, in the vehicle 1 of the present embodiment, even when the steering wheel is turned in the opposite direction, it is possible to suppress overshoot of the actual yaw rate after the steering wheel is turned.

In the example illustrated in FIG. 4, since the target yaw rate is zero after the time point "3.0," the steering wheel is returned to its initial state at the time point "3.0," and after the time point "3.0," the steering wheel is maintained in its initial state. After the time point "3.0," even though the target yaw rate is maintained at zero, the actual yaw rate may overshoot immediately after the time point "3.0" due to the influence of changes in the target yaw rate up until just before the target yaw rate becomes zero.

In the example illustrated in FIG. 4, during the period from near the time point "3.0" to near the time point "3.4," the actual yaw rate (solid line D40) is higher than the target yaw rate (chain line C10), indicating that the deviation is greater than a value representing overshoot. Thus, during the period from near the time point "3.0" to near the time point "3.4," the vehicle control device 70 of the present embodiment causes execution of differential limiting by setting the transfer clutch of the differential limiting device to the engaged state. Consequently, the understeer-side yaw moment occurs, as indicated by solid line D60. As a result, in the vehicle 1 of the present embodiment, it is possible to suppress overshoot of the actual yaw rate immediately after the steering wheel is returned to its initial state.

Figure 5:
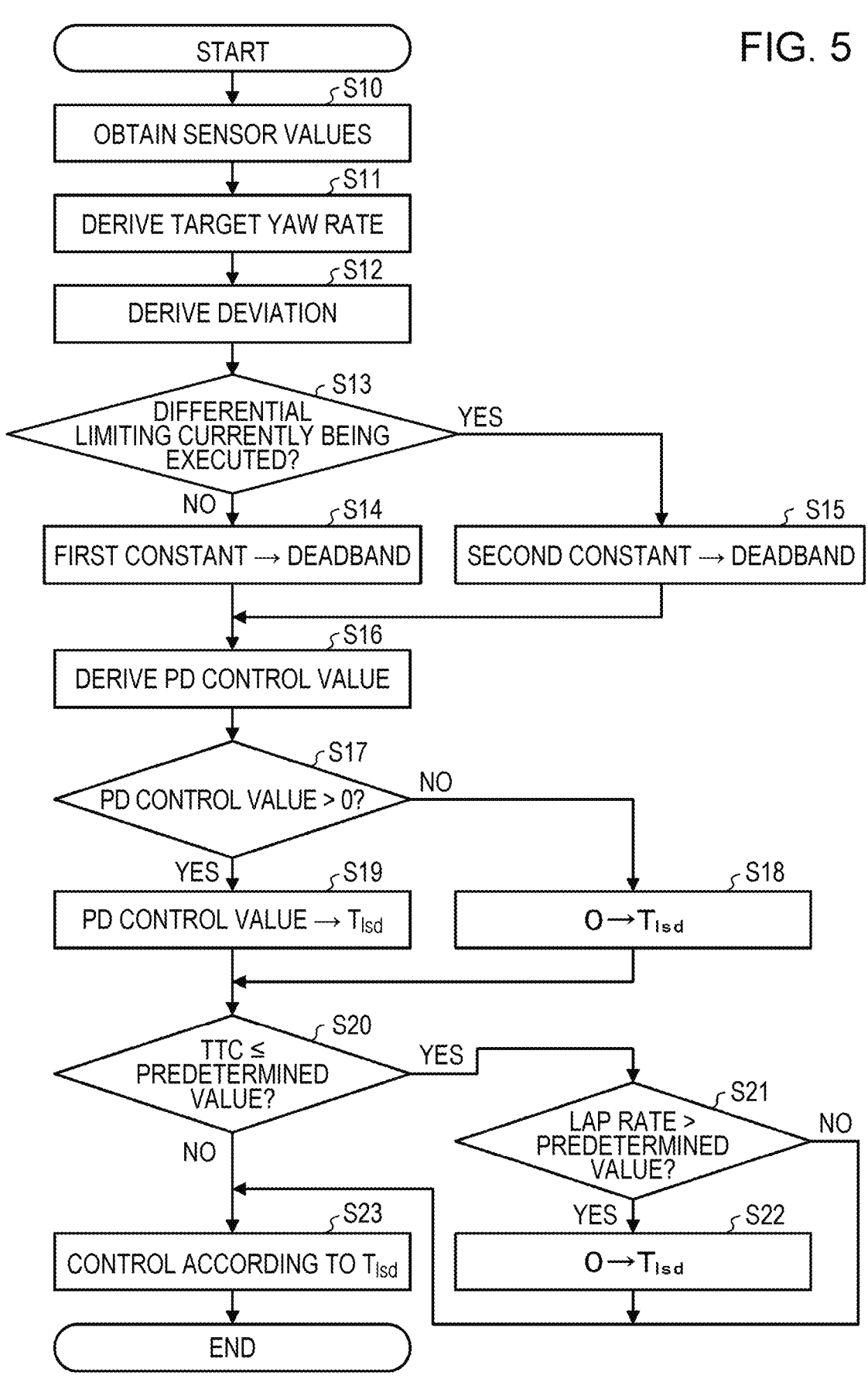
FIG. 5 is a flowchart illustrating the details of the operation of the vehicle control device of the present embodiment.

FIG. 5 is a flowchart illustrating the details of the operation of the vehicle control device 70 of the present embodiment. The LSD controller 90 of the vehicle control device 70 performs a series of processes as illustrated in the flowchart of FIG. 5 at each arrival of predetermined execution timing, which repeats at predetermined time intervals.

When the predetermined execution timing arrives, the LSD controller 90 obtains sensor values detected by the individual sensors from these sensors (S10). For example, the LSD controller 90 may obtain the actual yaw rate from the yaw rate sensor 48, the steering angle from the steering angle sensor 42, and the wheel speeds from the wheel speed sensors 50.

Next, the LSD controller 90 derives the target yaw rate using equation (1) below (S11):

$$\gamma_{th} = \frac{1}{1 + A \cdot V^2} \cdot \frac{V}{L} \cdot \frac{\theta_H}{n} \quad (1)$$

where "$\gamma_{th}$" is the target yaw rate, "$\theta_H$" is the steering angle, "V" is the vehicle speed, "A" is the stability factor, "L" is the wheel base, and "n" is the steering gear ratio. "A," "L," and "n" are determined based on the characteristics of the vehicle, and the variables are "$\theta_H$" and "V" in effect. As "$\theta_H$," the steering angle obtained by the steering angle sensor 42 can be used. As "V," the vehicle speed estimated based on the wheel speeds obtained by the wheel speed sensors 50 can be used.

In this way, the LSD controller 90 may derive the target yaw rate based on the steering angle obtained by the steering angle sensor 42, and the vehicle speed estimated based on the wheel speeds obtained by the wheel speed sensors 50.

Next, the LSD controller 90 derives the deviation of the actual yaw rate relative to the target yaw rate using equation (2) below (S12):

$$\Delta\gamma = \text{sign}(\gamma_{th}) \cdot (\gamma - \gamma_{th}) \quad (2)$$

where "$\Delta\gamma$" is the deviation, "$\gamma_{th}$" is the target yaw rate derived by equation (1) above, and "$\gamma$" is the actual yaw rate obtained by the yaw rate sensor 48. In equation (2), "$\gamma - \gamma_{th}$" corresponds to subtraction of the target yaw rate from the actual yaw rate. In equation (2), "sign ($\gamma_{th}$)" refers to a function that returns the sign of "$\gamma_{th}$." For example, if "$\gamma_{th}$" is a positive value, "sign ($\gamma_{th}$)" is "1"; if "$\gamma_{th}$" is a negative value, "sign ($\gamma_{th}$)" is "−1"; and if "$\gamma_{th}$" is zero, "sign ($\gamma_{th}$)" is "0."

Next, the LSD controller 90 determines whether differential limiting by the differential limiting device is currently being executed (S13). For example, the LSD controller 90 may determine that differential limiting is currently being executed when the indicator value of the engagement force of one or more of the front transfer clutch 32F and the rear transfer clutch 32R is greater than zero at this moment.

If it is determined that differential limiting by the differential limiting device is not currently being executed (NO in S13), the LSD controller 90 sets a predetermined first constant as the deadband for the deviation (S14), and then proceeds to the processing of step S16. The predetermined first constant may be stored in advance in the memory(ies) 82, for example.

If it is determined that differential limiting by the differential limiting device is currently being executed (YES in S13), the LSD controller 90 sets a predetermined second constant as the deadband for the deviation (S15), and then proceeds to the processing of step S16. The predetermined second constant is assumed to be a value greater than the predetermined first constant. The predetermined second constant may be stored in advance in the memory(ies) 82, for example.

In step S16, the LSD controller 90 derives a proportional derivative (PD) control value using equation (3) below (S16):

$$u(t) = K_p \cdot (\Delta\gamma - \varepsilon) + K_d \cdot \frac{d\Delta\gamma}{dt} \quad (3)$$

where "u(t)" is the PD control value, and "$\Delta\gamma$" is the deviation derived by equation (2) mentioned above. "$\varepsilon$" is the deadband set in step S14 or S15, and "$\Delta\gamma - \varepsilon$" corresponds to subtraction of the deadband from the deviation. "$K_p$" is the proportional gain. "$d\Delta\gamma/dt$" is the time derivative of the deviation. "$K_d$" is the derivative gain.

As indicated in equation (3), the LSD controller 90 derives the control value of proportional control of the deviation by multiplying the difference "$\Delta\gamma - \varepsilon$" between the deviation and the deadband with the proportional gain "$K_p$." The LSD controller 90 derives the control value of derivative control of the deviation by multiplying the time derivative "$d\Delta\gamma/dt$" of the deviation with the derivative gain "$K_d$." The LSD controller 90 derives the PD control value "u(t)" by adding the control value of proportional control of the deviation and the control value of derivative control of the deviation. In this way, the PD control value includes the control value of proportional control of the deviation and the control value of derivative control of the deviation. The PD control value corresponds to the output value in the case where proportional-derivative control (PD control) is performed on the deviation.

Additionally, in equation (3), proportional control is performed using the value "$\Delta\gamma - \varepsilon$," which corresponds to subtraction of the deadband "$\varepsilon$" from the deviation "$\Delta\gamma$." Compared to an example in which the deadband "$\varepsilon$" is not provided, the PD control value "u(t)" can be shifted by the amount based on the deadband "$\varepsilon$." Therefore, the timing at which the PD control value "u(t)" meets the comparison condition with a predetermined reference value (e.g., zero) can be finely adjusted using the deadband "$\varepsilon$."

As described above, in steps S13 to S15, the value of the deadband "$\varepsilon$" is changed depending on whether differential limiting is currently being executed. In the state where differential limiting is being executed, the value of the deadband "$\varepsilon$" is set as the relatively large second constant. This allows the shifted amount of the PD control value "u(t)" to be relatively large, enabling the appropriate release of differential limiting when the PD control value "u(t)" approaches a predetermined reference value (e.g., zero). In the state where differential limiting is not executed, the value of the deadband "$\varepsilon$" is set as the relatively small first constant. This allows the shifted amount of the PD control value "u(t)" to be relatively small, allowing the execution of differential limiting to start at appropriate timing when starting the execution of differential limiting.

After deriving the PD control value, the LSD controller 90 performs the processing of the concept represented in equation (4) below:

$$T_{lsd} = \max(u(t), 0) \tag{4}$$

where "$T_{lsd}$" is the indicator value of the engagement force of the transfer clutch, and "u(t)" is the PD control value derived from equation (3) mentioned above. "max(u(t), 0)" refers to a function that selects the greater value between "u(t)" and "0." That is, equation (4) above represents that, if "u(t)" is a value greater than "0," "u(t)" is set as "$T_{lsd}$"; and if "u(t)" is a value less than or equal to "0," "O" is set as "$T_{lsd}$."

As the processing related to equation (4) mentioned above, the LSD controller 90 performs the following steps S17 to S19. In step S17, the LSD controller 90 determines whether the derived PD control value "u(t)" is greater than zero (S17).

Here, the PD control value "u(t)" is obtained by performing PD control on the deviation "$\Delta\gamma$." Therefore, for the determination in step S17, it corresponds to determining whether the deviation "$\Delta\gamma$" is substantially greater than zero. Since the deviation "$\Delta\gamma$" corresponds to the difference between the actual yaw rate and the target yaw rate, when the deviation "$\Delta\gamma$" is substantially greater than zero, the deviation "$\Delta\gamma$" corresponds to representing overshoot.

As described above, in the vehicle control device 70 of the present embodiment, whether to execute differential limiting by the differential limiting device is determined based on whether the deviation is a value representing overshoot. As a method to achieve this concretely, the LSD controller 90, in step S17, determines whether the PD control value "u(t)" is greater than zero.

That is, in the present embodiment, the case where the deviation is not a value representing overshoot includes the case where the PD control value "u(t)" is less than or equal to zero, and the case where the deviation is a value representing overshoot includes the case where the PD control value "u(t)" is greater than zero.

If the PD control value is less than or equal to zero (NO in step S17), the LSD controller 90 sets zero "0" as the indicator value of the engagement force of the transfer torque (step S18), and proceeds to the processing of step S20. That is, in this case, the indicator value of the engagement force of the transfer clutch is set to zero, indicating the release of the transfer clutch.

If the PD control value is greater than zero (YES in step S17), the LSD controller 90 sets the PD control value "u(t)" derived in step S16 as the indicator value "$T_{lsd}$" of the engagement force of the transfer clutch (S19), and proceeds to the processing of step S20. That is, in this case, the indicator value "$T_{lsd}$" of the engagement force of the transfer clutch is a value greater than zero, indicating the engagement of the transfer clutch.

Here, in a situation where the vehicle 1 is to avoid an obstacle ahead, it is desirable for the steering response performance to be as high as possible. In such a situation, performing differential limiting may hinder the vehicle's ability to appropriately avoid an obstacle due to the action of the understeer-side yaw moment.

Considering this, when specific conditions indicating that the vehicle 1 intends to operate to avoid an obstacle are met, regardless of the deviation value, the LSD controller 90 prevents execution of differential limiting by the differential limiting device. As a result, in the vehicle 1 of the present embodiment, even if there is an obstacle ahead, the vehicle 1 is able to appropriately avoid the obstacle.

In more detail, as specific conditions indicating that the vehicle 1 intends to operate to avoid an obstacle, the conditions include the time-to-collision (TTC) being less than or equal to a predetermined value (YES in step S20), and the lap rate being greater than a predetermined value (YES in step S21).

The LSD controller 90 obtains information of the time-to-collision (TTC) from the external environment recognition device 64 and determines whether the time-to-collision (TTC) is less than or equal to the predetermined value (S20). Additionally, the LSD controller 90 obtains information of the lap rate from the external environment recognition device 64 and determines whether the lap rate is greater than the predetermined value (S21).

If the time-to-collision (TTC) is less than or equal to the predetermined value (YES in S20) and the lap rate is greater than the predetermined value (YES in S21), the LSD controller 90 sets zero "0" as the indicator value "$T_{lsd}$" of the engagement force of the transfer clutch (S22). That is, in this case, regardless of the value of the deviation "$\Delta\gamma$," the LSD controller 90 sets the indicator value of the engagement force of the transfer clutch to zero, indicating the release of the transfer clutch. As a result, differential limiting by the differential limiting device will not be executed. After the processing of step S22, the LSD controller 90 proceeds to the processing of step S23.

If the time-to-collision (TTC) is greater than the predetermined value (NO in step S20), or if the time-to-collision (TTC) is less than or equal to the predetermined value but the lap rate is less than or equal to the predetermined value (NO in step S21), it is inferred that no obstacle avoidance is necessary, or that avoidance has already been completed. In this case, the process directly proceeds to the processing of step S23.

In step S23, the LSD controller 90 controls the transfer clutch according to the set indicator value "$T_{lsd}$" of the engagement force of the transfer clutch (S23), and ends the series of processes.

That is, if zero "0" is set as the indicator value "$T_{lsd}$" of the engagement force of the transfer clutch, the LSD controller 90 sets the transfer clutch to the released state. For example, the LSD controller 90 sets the front transfer clutch 32F to the released state through the first actuator 60, and sets the rear transfer clutch 32R to the released state through the second actuator 62. As a result, differential limiting by the differential limiting device will not be executed.

In addition, if the PD control value "u(t)" is set as the indicator value "$T_{lsd}$" of the engagement force of the transfer clutch, the LSD controller 90 causes the transfer clutch to be engaged according to the PD control value "u(t)," which serves as the indicator value of the engagement force of the transfer clutch. For example, the LSD controller 90 sets the front transfer clutch 32F to the engaged state through the first actuator 60, and sets the rear transfer clutch 32R to the engaged state through the second actuator 62. As a result, differential limiting by the differential limiting device will be executed.

Note that the LSD controller 90 may control either the front transfer clutch 32F or the rear transfer clutch 32R, according to the indicator value "$T_{lsd}$" of the engagement force of the transfer clutch, while omitting the control of the other.

As described above, the vehicle control device 70 of the present embodiment includes deriving the target yaw rate based on the steering angle obtained by the steering angle sensor 42. The vehicle control device 70 of the present embodiment includes deriving the deviation of the actual yaw rate, obtained by the yaw rate sensor 48, relative to the target yaw rate. The vehicle control device 70 of the present embodiment includes preventing execution of differential limiting by the differential limiting device when the deviation is not a value representing overshoot where the actual yaw rate is substantially higher than the target yaw rate. The vehicle control device 70 of the present embodiment includes causing execution of differential limiting by the differential limiting device when the deviation is a value representing overshoot.

As a result, the vehicle control device 70 of the present embodiment achieves a relatively quick rise in the actual yaw rate during the initial steering phase, while also suppressing overshoot of the actual yaw rate.

Therefore, according to the vehicle control device 70 of the present embodiment, it is possible to suppress a decrease in the stability of the vehicle's yaw behavior without impairing the responsiveness of the vehicle's yaw behavior in response to steering during turning.

Although the embodiment of the disclosure has been described above with reference to the accompanying drawings, it goes without saying that the disclosure is not limited to the embodiment. It is clear for those skilled in the art to be able to conceive of various changes or modifications within the scope described in the claims, and it is understood that they also naturally fall within the technical scope of the disclosure.

Note that the processes described in the present specification are not necessarily executed in the order illustrated in the flowchart, and may include parallel processing or subroutine-based processing.

According to the disclosure, it is possible to improve the stability of the vehicle's yaw behavior without impairing the responsiveness of the vehicle's yaw behavior in response to steering.

The vehicle control device 70 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicle control device 70 including the LSD controller 90. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle control device configured to be applied to a vehicle, the vehicle comprising:

a steering angle sensor configured to detect a steering angle;

a yaw rate sensor configured to detect an actual yaw rate;

a differential device configured to allow differential action between a left wheel and a right wheel of the vehicle; and a differential limiting device configured to limit differential action of the left wheel and the right wheel through the differential device, the vehicle control device comprising:

one or more processors; and one or more memories coupled to the one or more processors, the one or more processors being configured to:

derive a target yaw rate based on the steering angle obtained by the steering angle sensor;

derive a deviation between the actual yaw rate, obtained by the yaw rate sensor, and the target yaw rate;

when the deviation is not a value representing overshoot, the overshoot being a state in which the actual yaw rate is substantially higher than the target yaw rate, prevent execution of differential limiting by the differential limiting device;

when the deviation is a value representing the overshoot, cause execution of differential limiting by the differential limiting device; and derive a proportional derivative control value including a control value of proportional control of the deviation and a control value of derivative control of the deviation, wherein the deviation is not a value representing overshoot when the proportional derivative control value is less than or equal to zero;

wherein the deviation is a value representing overshoot when the proportional derivative control value is greater than zero; and wherein the one or more processors is further configured to:

prevent execution of differential limiting by the differential limiting device when the proportional derivative control value is less than or equal to zero; and cause execution of differential limiting by the differential limiting device when the proportional derivative control value is greater than zero.

2. The vehicle control device according to claim 1, wherein:

the one or more processors are configured to:

determining whether differential limiting by the differential limiting device is currently being executed;

when it is determined that differential limiting by the differential limiting device is not currently being executed, set a predetermined first constant as a deadband for the deviation; and when it is determined that differential limiting by the differential limiting device is currently being executed, set a second constant, greater than the first constant, as the deadband; and deriving the proportional derivative control value comprises:

deriving the control value of the proportional control by multiplying a difference between the deviation and the deadband with a proportional gain; and deriving the proportional derivative control value by adding the control value of the proportional control and the control value of the derivative control.

3. The vehicle control device according to claim 1, wherein:

the differential limiting device comprises a transfer clutch configured to transmit transfer torque between the left wheel and the right wheel; and the one or more processors are configured to:

when it is determined to prevent execution of differential limiting by the differential limiting device, release the transfer clutch by setting an indicator value of an engagement force of the transfer clutch to zero, and when it is determined to cause execution of differential limiting by the differential limiting device, set the derived proportional derivative control value as the indicator value of the engagement force of the transfer clutch, and cause the transfer clutch to be engaged according to the indicator value of the engagement force of the transfer clutch.

4. The vehicle control device according to claim 1, wherein:

the vehicle further comprises an external environment recognition device configured to detect an obstacle around the vehicle; and the one or more processors are further configured to, when a specific condition indicating that the vehicle intends to operate to avoid the obstacle is met, prevent execution of differential limiting by the differential limiting device regardless of a value of the deviation.

* * * * *